US006026282A

United States Patent [19]

Garcia et al.

[11] Patent Number: 6,026,282

[45] Date of Patent: Feb. 15, 2000

[54] CARRY CASE AND EXTERNAL ELECTRONIC ACCESSORY ASSEMBLY

[75] Inventors: Jorge L. Garcia, Plantation; Joseph Patino, Pembroke Pines, both of Fla.

[73] Assignee: Motorola, Inc., Schaumburg, Ill.

[21] Appl. No.: 08/958,513

[22] Filed: Oct. 27, 1997

[51] Int. Cl.[7] .......... H04B 1/38

[52] U.S. Cl. .......... 455/90; 455/347

[58] Field of Search .......... 455/90, 347, 348, 455/349, 350, 351, 95, 569, 66; 379/428, 433, 434; 439/528, 929.1

[56] References Cited

U.S. PATENT DOCUMENTS

| | | | |
|---|---|---|---|
| 3,851,123 | 11/1974 | Lipinski et al. | 179/182 R |
| 3,969,796 | 7/1976 | Hodsdon et al. | 455/90 |
| 4,602,351 | 7/1986 | Shimamura et al. | 439/929.1 |
| 4,858,798 | 8/1989 | Siddoway et al. | 224/242 |
| 5,038,400 | 8/1991 | Baracat et al. | 455/90 |
| 5,732,331 | 3/1998 | Harms | 455/90 |

*Primary Examiner*—Lee Nguyen
*Attorney, Agent, or Firm*—Barbara R. Doutre

[57] ABSTRACT

A carry case and electronic accessory assembly (100) provides direct interconnection between an external electronic accessory (104) and a portable radio (202) with minimal use of interface contacts. The external electronic accessory (104) includes a remote accessory (114) attached to a connector (106) having a substantially rigid portion (108) and a pivotal portion (110). The substantially rigid portion (108) attaches to the carry case housing (102) and provides a retention means within which the pivotal portion (110) can move. The pivotal portion (110) latches to the radio (202) to provide direct electrical contact between accessory contacts (124) of the external electronic accessory (104) and the radio contacts (204) of portable radio (202).

11 Claims, 4 Drawing Sheets

131 130 202 110 106 114 104 102 108 128

CARRY CASE AND EXTERNAL ELECTRONIC ACCESSORY ASSEMBLY

TECHNICAL FIELD

This invention relates generally to electronic accessories, and more particularly to electronic accessories used in conjunction with portable radios which are worn in carry cases.

BACKGROUND

A portable radio is often used in conjunction with a remote radio accessory to provide a hands free mode of operation. In a vehicular environment, for example, a vehicular adapter can be used to remote the radio's speaker and microphone functions to an external speaker and external microphone. Another example of an accessory which facilitates hands free operation is the remote speaker microphone (mic). The remote speaker mic, which may also include radio frequency (RF) capability, is usually worn on the user's shoulder and interconnects to the portable radio through a cable and connector while the portable radio remains attached to the user's side through a carry case and belt clip. The remote speaker mic allows the user to access radio controls without having to remove the radio from his side. However, it is not always practical for the user to go from the remote speaker mic mode of operation to the vehicular environment.

When changing from the remote speaker mic mode to the vehicular adapter mode, carry cases which use T-straps to retain the radio can be particularly cumbersome in that the user is required to unsnap the T-strap, remove the radio from the carry case, disconnect the remote speaker mic from the radio, and remove the remote speaker mic from the shoulder to keep the unattached cable from thrashing about. In the public service environment, such as the police force or fire department for example, it is particularly desirable to have a quick connect/disconnect feature which allows the user to change from the remote speaker mic mode to the vehicular adapter mode.

An example of a carry case which facilitates removal of a radio being used in conjunction with an external accessory is described in a patent entitled "Carry Case Holder for an Electronic Device" issued as U.S. Pat. No. 5,038,400 assigned to Motorola, Inc. and which is herein incorporated by reference. Product designers are continually looking to reduce cost and ease manufacturability. An accessory assembly which eliminates the use of interface contacts within the carry case housing would be advantageous in terms of alignment issues as well as cost savings. Accordingly, there is a need for an improved carry case and accessory assembly which provides remote accessory capability with a quick connect/disconnect feature for the radio with minimal use of interface contacts.

DETAILED DESCRIPTION OF THE PREFERRED EMBODIMENT

Figure 1:
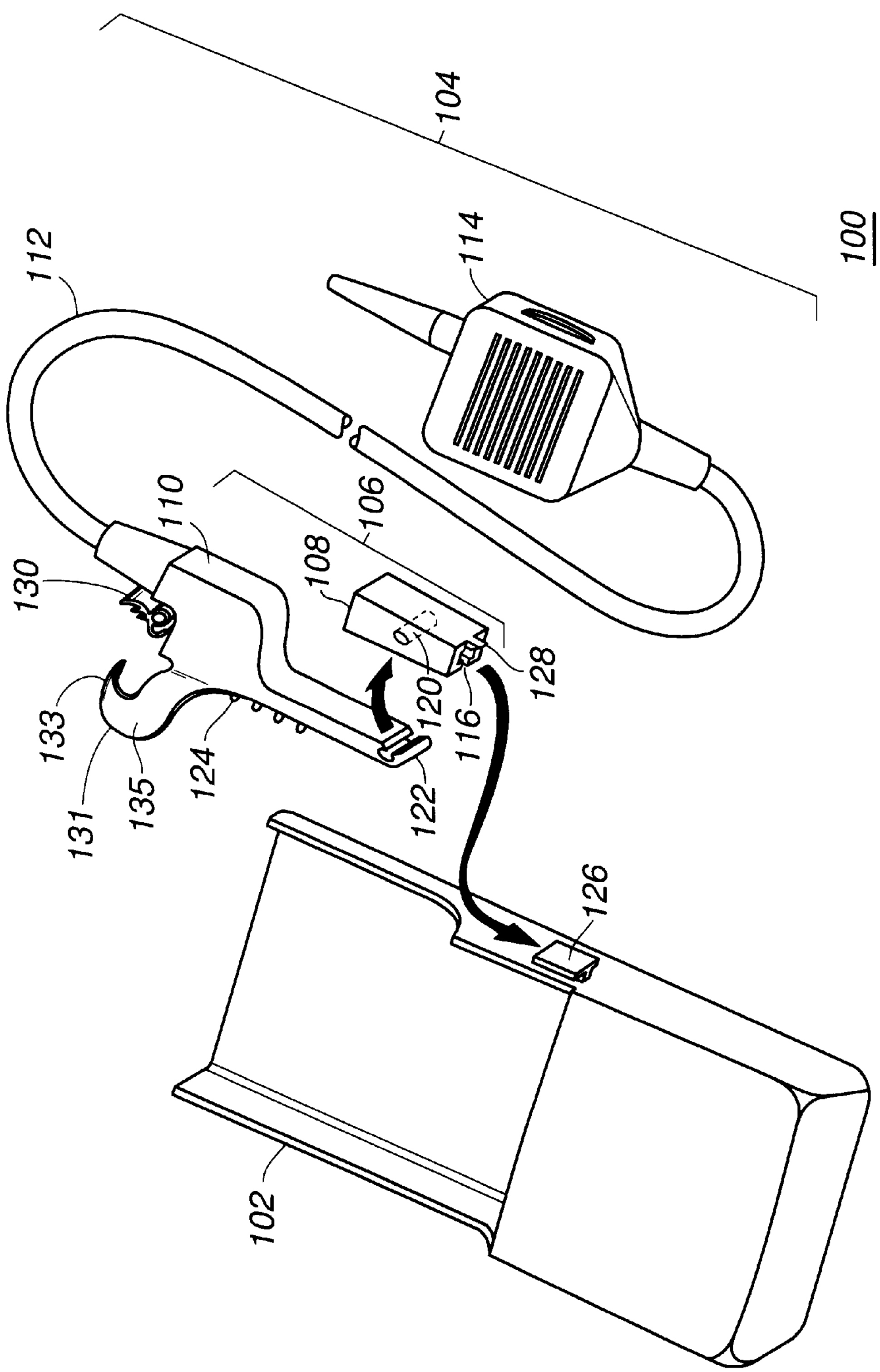
FIG. 1 is an exploded view of a carry case and external electronic accessory assembly in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown an exploded view of a carry case and external electronic accessory assembly in accordance with the present invention. Accessory assembly 100 includes carry case housing 102 and an external electronic accessory 104. In accordance with the present invention, the external electronic accessory 104 is comprised of a connector 106 having first and second portions 108, 110 respectively. The second connector portion 110 is coupled, preferably through a cable 112, to a remote accessory, such as a remote speaker microphone (mic) 114.

In accordance with the preferred embodiment, first and second connector portions 108 and 110 are assembled and then mounted as connector 106 to the carry case housing 102. In accordance with the invention, first connector portion 108 provides a substantially rigid portion within which to pivotally retain the second connector portion 110. Second connector portion 110 will also be referred to as pivotal portion 110. In accordance with the preferred embodiment of the invention, first and second connector portions 108, 110 are preferably formed of molded plastic. The first connector portion 108 includes a retaining wall 116 and a pivot pin 120. The second connector portion 110 includes a hook 122 to pivotally connect the second connector portion within the first connector portion 108. The second connector portion 110 also includes accessory contacts 124 for mating the electronic features of remote speaker mic 114 to a radio (shown in later views).

In accordance with the present invention, connector 106 couples to the carry case housing 102, preferably through guide rails 126 located on the housing which retain the first connector portion 108. Guide rails 126 are preferably formed of a plastic material similar to that used for the first connector portion 108. The carry case housing 102 may be formed of a variety of materials including rigid or semi rigid materials, such as plastic or leather. In accordance with the preferred embodiment, the retaining wall 116 of the first connector portion 108 slidably fastens to the guide rails 126 of the carry case housing 102 while the second connector portion 110 pivotally aligns with and provides direct electrical interconnection between the accessory contacts 124 and the radio contacts (shown in later views). A latch 128 is preferably included on the first connector portion 108 as a retention means to prevent the first connector portion from sliding off the guide rails.

A second latch 130, preferably a spring loaded latching mechanism, is coupled to the second connector portion 110 for latching the second connector portion to the radio. Once latched, a captivation device 131 retains the radio within the carry case housing 102. Captivation device 131 is preferably uniformly molded as part of connector portion 110 and includes an upper surface 133 and front surface 135 which align and captivate the radio once latch 130 is latched to the radio.

Figure 2:
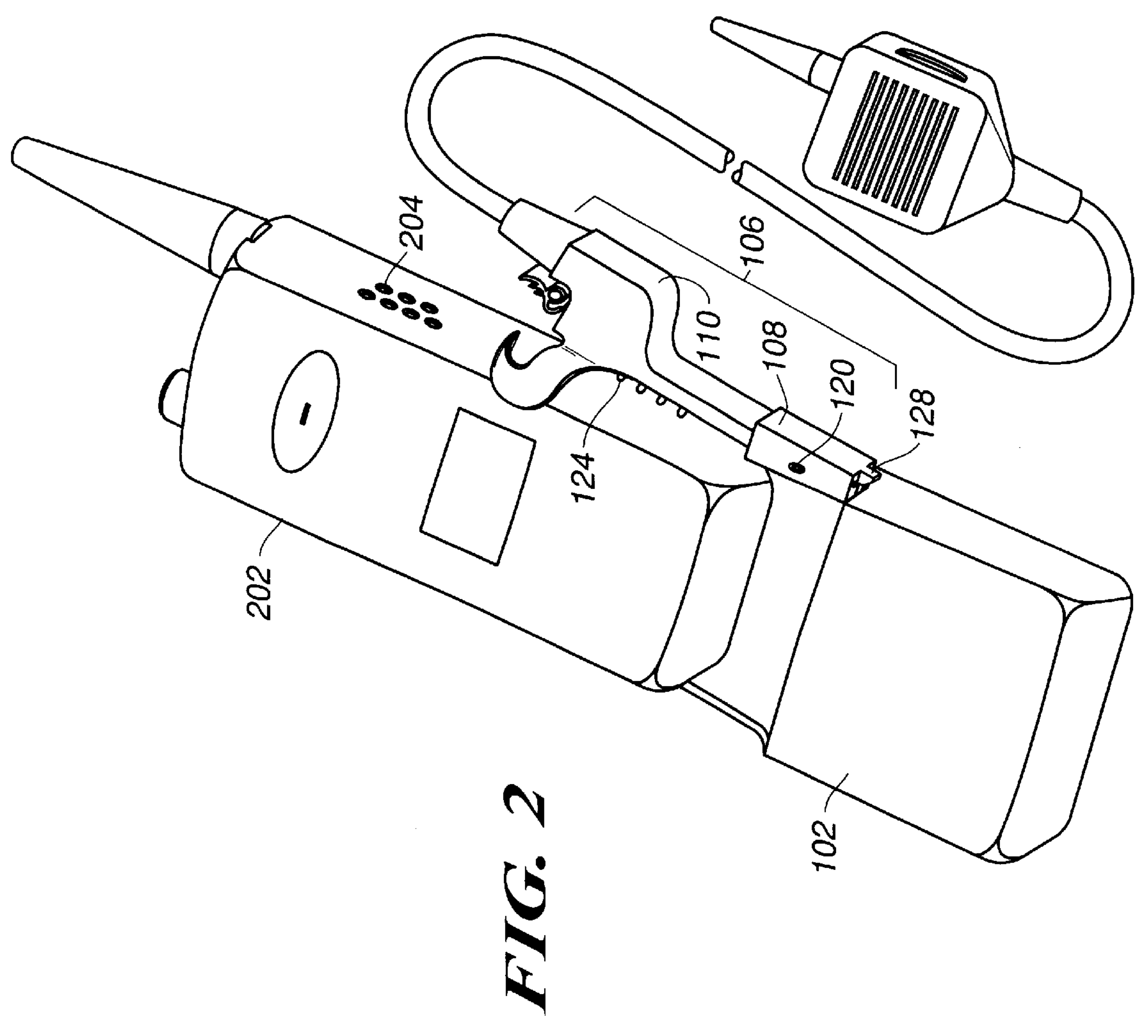
FIG. 2 is an assembled view of the carry case and external electronic accessory assembly of FIG. 1 with a radio partially inserted into the carry case in accordance with the present invention.

FIG. 2 shows a radio 202, such as a two-way radio, partially inserted in the assembled carry case and accessory assembly of the present invention. As shown in FIG. 2, the connector 106 mounts to the carry case through first connector portion 108 and pivotally interconnects, through second connector portion 110, the accessory contacts 124 directly to radio contacts 204. The substantially rigid portion 108 of the connector 106 is coupled to the guide rails 126 of the carry case housing 102 with first latch 128 engaged to prevent the connector 106 from sliding off the carry case housing 102. In this view, the second connector portion 110 is engaged about the pivot pin 120 and is shown unlatched and pivotally moved from the side of the radio 202.

Figure 3:
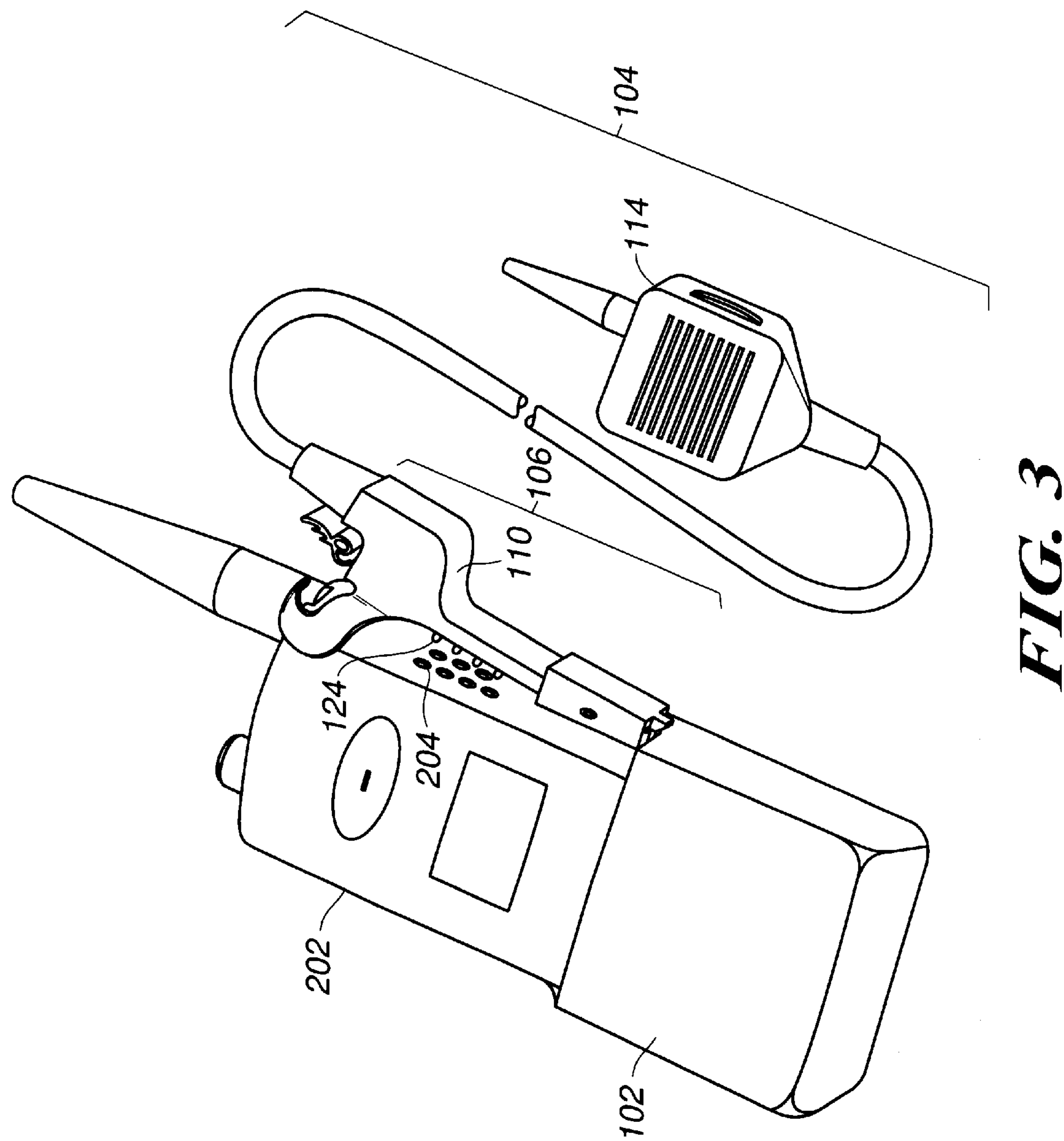
FIG. 3 shows a radio fully inserted into the carry case with the radio contacts aligned with the accessory contacts of the external electronic accessory in accordance with the present invention.

FIG. 3 shows the radio 202 fully inserted into the carry case housing 102 with the radio contacts 204 aligned with the accessory contacts 124 in accordance with the present invention. The connector 106 of the present invention thus mounts to the carry case housing 102 through first connector portion 108 and pivotally interconnects the accessory contacts 124 directly to the radio contacts 204 through second connector portion 110 without the use of any interface contacts.

Figure 4:
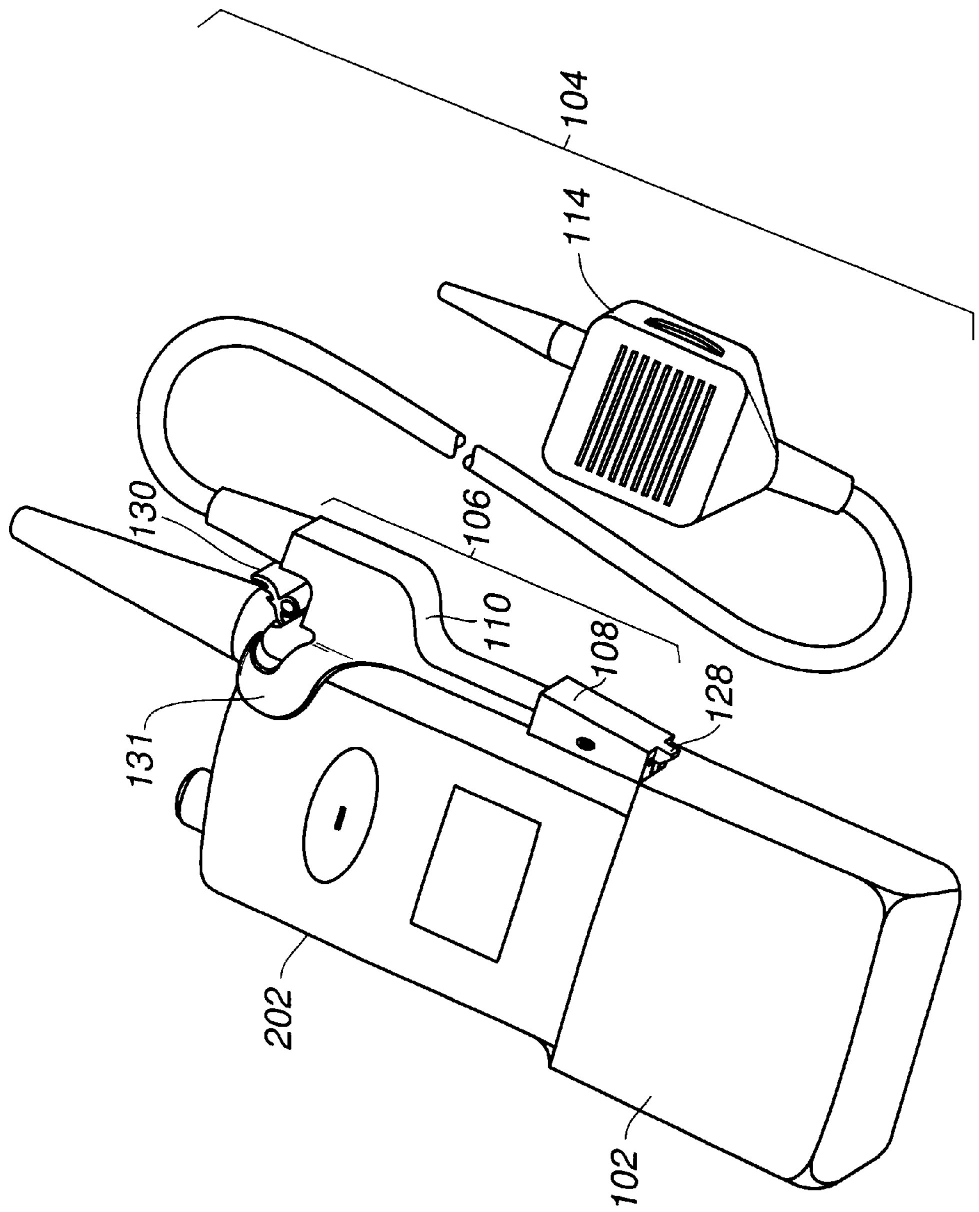
FIG. 4 shows the radio fully inserted into the carry case with the accessory connector latched to the radio in accordance with the present invention.

FIG. 4 shows the carry case and accessory assembly with the radio 202 completely inserted and the pivotal portion 110 of connector 106 clamped onto the radio 202 through latch 130. Thus, second connector portion 110 is coupled to the radio through latch 130 while captivation device 131 retains the radio within the carry case housing 102. Radio 202 is retained within the carry case housing 102 with the radio's electronic functions remoted to the remote speaker mic 114 through the direct coupling of the radio contacts 204 to the accessory contacts 124.

To disconnect the radio 202 from the carry case housing 102, a simple one handed operation can be used to release the latch 130 and remove the radio. Releasing the latch 130 unclasps the radio 202 and allows the second connector portion 110 to pivot away from the radio thereby providing easy removal of the radio from carry case 102. Once the radio 202 is removed, the carry case 102 and external electronic accessory 104 remain attached to the user so that the user can later reinsert the radio and use a single handed operation to re-latch the pivotal connector portion 110 and reconnect the radio 202 to the external electronic accessory 104. Alternatively, if the user wishes to remove the external electronic accessory 104 from the carry case housing, the user simply unlatches the first latch 128 of the rigid connector portion 108 and slides off connector 106 to revert to a carry case without remote accessory capability.

Accordingly, there has been provided an improved accessory assembly which provides remote accessory capability with a quick connect/disconnect feature for the radio without the use of interface contacts. The carry case and external electronic accessory assembly 100 described by the invention can remain worn by the user while the radio is being used in another mode of operation, for example in a vehicular adapter. The carry case and external electronic accessory assembly 100 allows the radio to be connected/disconnected quickly and easily with a one-handed operation without the use of snaps or screws. The direct contact between the radio contacts 204 and the accessory contacts 124 provides a reliable interconnection between the radio 202 and its remote accessory 114.

The carry case and external electronic accessory assembly 100 combines ease of manufacturability and low cost. Accessory assembly 100 has eliminated the use of interface contacts and allows the manufacturer to sell the same carry case 102 regardless of whether the customer will later require optional external accessories. While remote accessory 114 has been described in terms of a remote speaker mic, one skilled in the art realizes that a variety of remote electronic accessories can be utilized, with or without RF capability, such as remote earpiece, helmet radio attachments, mic only, and speaker only options to name but a few.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An accessory assembly for a portable radio having radio contacts, comprising:

a carry case housing for receiving the portable radio; and an external electronic accessory having a connector with accessory contacts, the connector including a hook, a latch, and a uniformly molded captivation device, the connector pivotally mounting to the carry case housing via the hook thereby pivotally aligning the radio contacts to the accessory contacts, the latch for interconnecting the accessory contacts to the radio contacts, and the uniformly molded captivation device for retaining the portable radio within the carry case housing.

2. An accessory assembly as described in claim 1, wherein the external electronic accessory includes a remote speaker microphone.

3. An accessory assembly as described in claim 1, wherein the external electronic accessory includes a remote earpiece.

4. A carry case and external electronic accessory assembly for a portable radio having radio contacts, comprising:

at the carry case:

a carry case housing for receiving the portable radio; and guide rails coupled to the carry case housing;

at the external electronic accessory:

a remote accessory;

a first connector portion having a retaining wall and including a pivot pin;

a second connector portion having a hook for pivotally connecting about the pivot pin of the first connector portion, the second connector portion also including accessory contacts electrically coupled to the remote accessory;

said retaining wall of the first connector portion slidably fastening to the guide rails of the carry case housing while the second connector portion pivotally aligns with and provides direct electrical interconnection between the accessory contacts of the external electronic accessory and the radio contacts; and a first latch for latching the second connector portion to the radio.

5. A carry case and external electronic accessory assembly as described in claim 4, further comprising a captivation device uniformly molded as part of the second connector portion for retaining the radio within the carry case housing once the second connector portion is latched to the radio.

6. A carry case and external electronic accessory assembly as described in claim 4, further including a second latch coupled to the first connector portion for retaining the retaining wall of the first connector portion to the guide rails of the carry case housing.

7. A carry case and external electronic accessory assembly as described in claim 4, wherein the remote accessory comprises a remote speaker microphone.

8. A carry case and external electronic accessory assembly as described in claim 4, wherein the remote accessory comprises a remote earpiece.

9. A carry case and external electronic accessory assembly as described in claim 4, wherein remote accessory includes a speaker.

10. A carry case and external electronic accessory assembly as described in claim 4, wherein the remote accessory includes a microphone.

11. An accessory assembly for a portable radio, comprising:

a carry case housing for receiving the portable radio; and an external electronic accessory, including:

a remote accessory:

a connector coupled to the remote accessory, the connector having a substantially rigid portion and a pivotal portion, the substantially rigid portion coupling to the carry case housing and providing a retention means within which the pivotal portion can move via a hook, the pivotal portion mating with the portable radio via a latch to provide direct electrical contact between the external electronic accessory and the portable radio, and the pivotal portion including a uniformly molded captivation device for captivating the radio within the carry case.

* * * * *